United States Patent [19]
Zarian et al.

[11] Patent Number: 5,987,199
[45] Date of Patent: Nov. 16, 1999

[54] SIDE LIGHTING OPTICAL CONDUIT

[75] Inventors: James R. Zarian, Corona Del Mar; John A. Robbins, Lake Forest; Dennis Sitar, Trabuco Canyon; James A. Holme, Garden Grove, all of Calif.

[73] Assignee: Lumenyte International Corporation, Irvine, Calif.

[21] Appl. No.: 09/077,202

[22] PCT Filed: Jan. 17, 1997

[86] PCT No.: PCT/US97/00979

§ 371 Date: May 21, 1998

§ 102(e) Date: May 21, 1998

[87] PCT Pub. No.: WO97/26583

PCT Pub. Date: Jul. 24, 1997

Related U.S. Application Data

[60] Provisional application No. 60/010,256, Jan. 19, 1996.

[51] Int. Cl.$^6$ .................................................. G02B 6/26
[52] U.S. Cl. ............................................. 385/31; 362/559
[58] Field of Search .................................... 385/30, 31, 42, 385/52, 53, 91, 95, 102, 123, 124, 125, 130, 141, 132, 147; 362/551–559; 81/9.4; 29/426.2, 426.4; 156/85, 86; 264/230, 271.1, 279.1, 342 R

[56] References Cited

U.S. PATENT DOCUMENTS

| | | | |
|---|---|---|---|
| 4,969,703 | 11/1990 | Fyfe et al. | 385/88 |
| 5,067,831 | 11/1991 | Robbins et al. | 385/123 |
| 5,221,387 | 6/1993 | Robbins et al. | 156/85 |

*Primary Examiner*—Akm E. Ullah
*Attorney, Agent, or Firm*—Small Larkin, LLP

[57] ABSTRACT

An optical fiber conduit (32) comprising an optical fiber core (22) surrounded by a cladding (24) with a reflective material or holder and/or reflector (34) attached adjacent to or in contact with the cladding (24) covered optical fiber core (22) along its longitudinal length and includes a plurality of illuminators (28–30) that are formed by uniform cuts (41) in the optical fiber core (22) emit reasonably even light perpendicularly along the length of the conduit (32) outwardly. The light pattern can be made to emit various beam patterns from very narrow to very wide by altering the shape of the optical fiber core (22) and/or by the cuts (41). The cut optical fiber is embedded in a clear environmentally protective coating to protect the cuts (41) from dust and moisture and to maintain the alignment of the holder and/or reflector (34) with optical elements (106) and the optical fiber core (22).

21 Claims, 6 Drawing Sheets

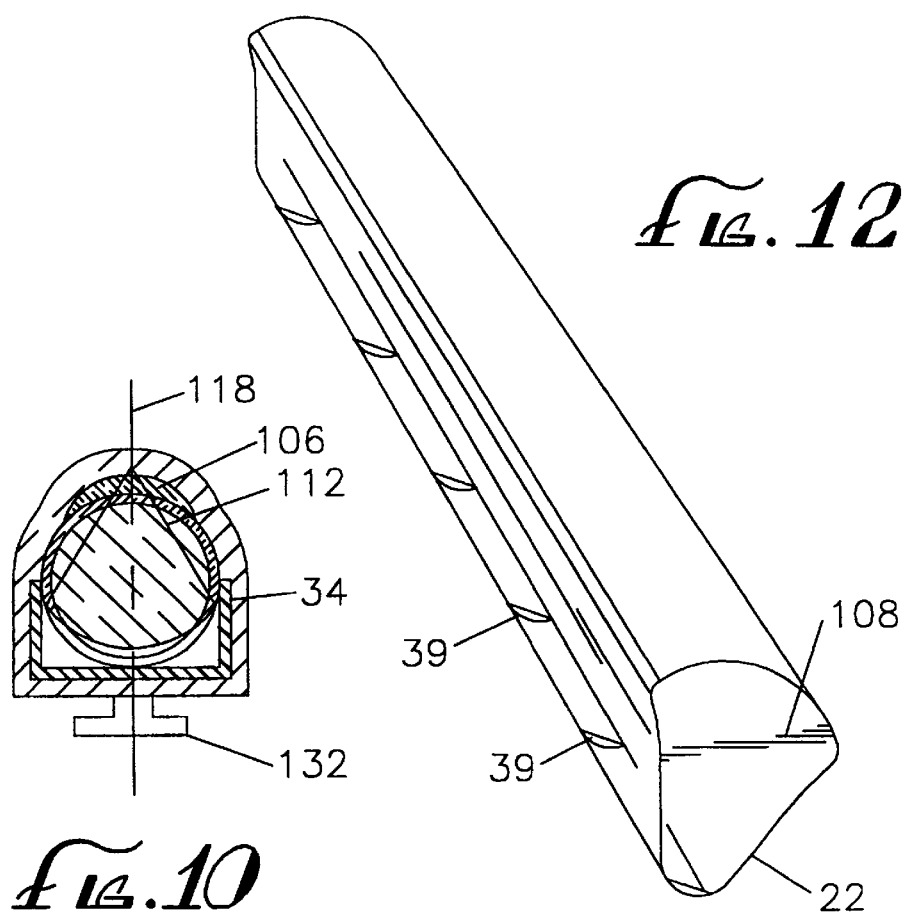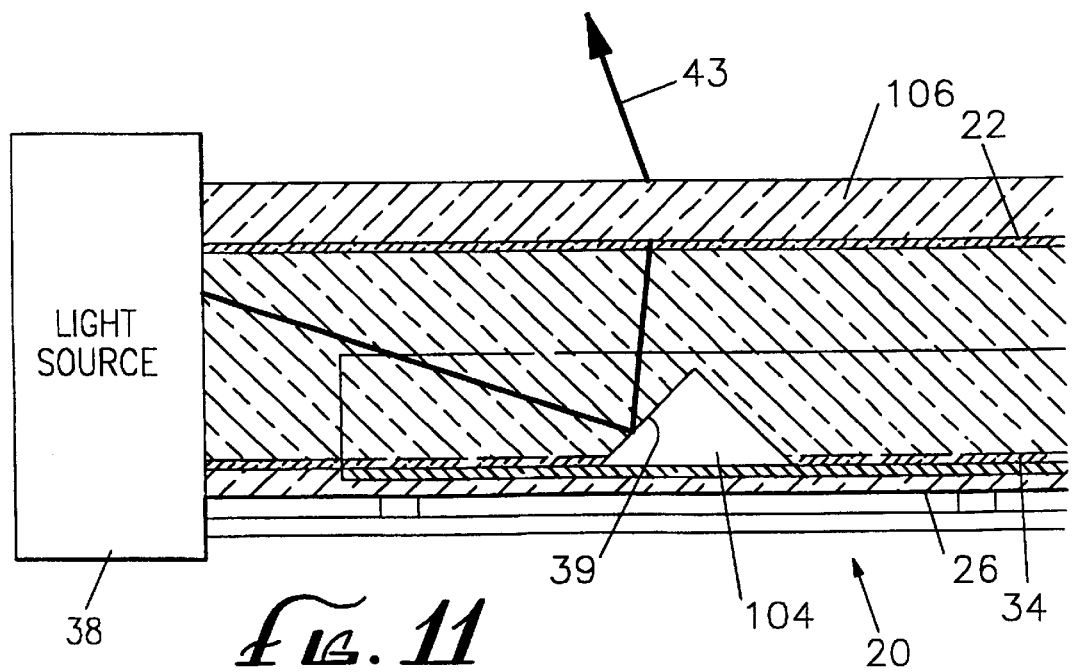

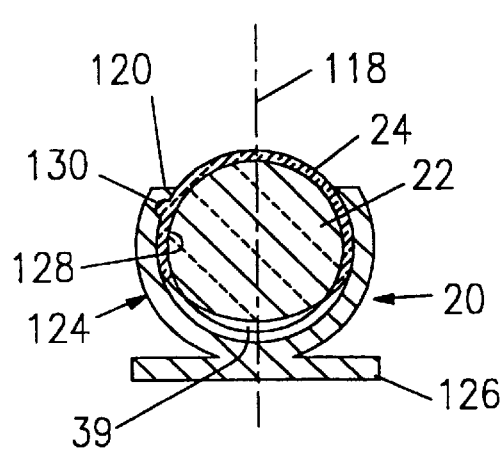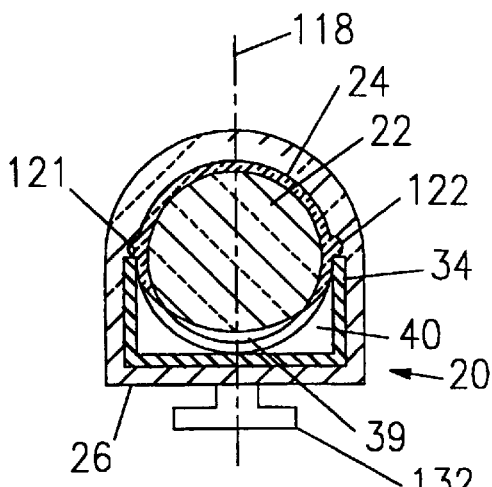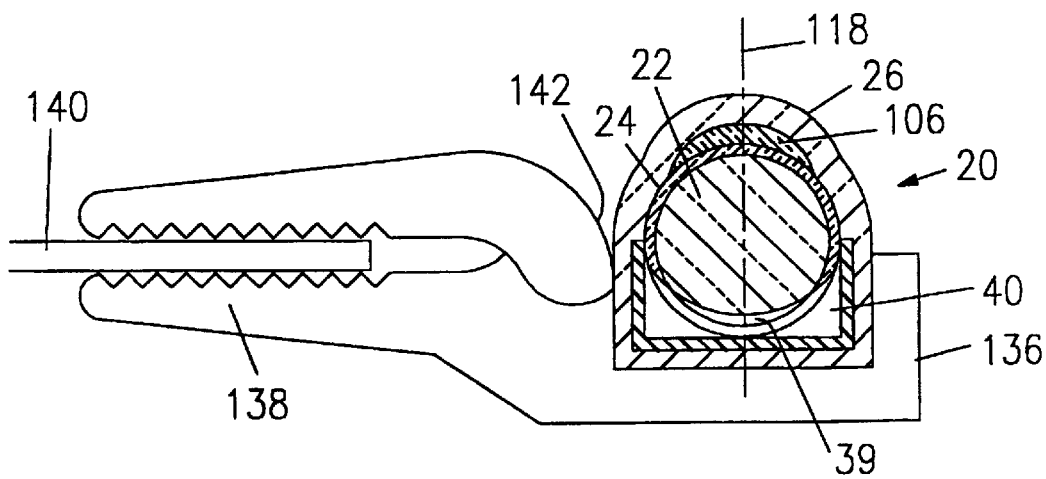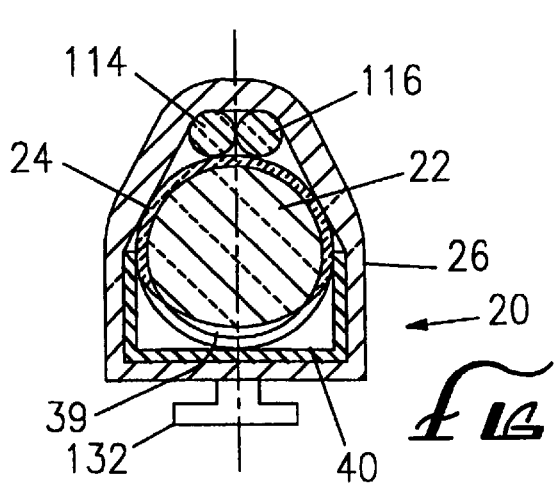

SIDE LIGHTING OPTICAL CONDUIT

This application is a provisional application of 60/010,256 filed on Jan. 19, 1996.

TECHNICAL FIELD

The present invention relates broadly to optical fibers for guiding light and more specifically to an improved optical fiber for linearly guiding light from a light source and emitting the light out of the sides of the optical fiber along its length.

BACKGROUND ART

Fiber optic light conduits have been used for many years to transport light from one point to another through many different light transmitting media such as glass, plastic, and liquid using the principle of Total Internal Reflection (TIR). In each of these cases, some light is lost while traveling along the length of the light conduit for various reasons such as, but not limited to, absorption, light rays that exceed the critical angle of the optic, and diffusion due to optical imperfections such as bubbles, voids and debris.

It has been the goal of fiber optic manufacturers to minimize the amount of light loss along the optical conduit to maximize the light coming out of the output end thereby creating a more efficient optical fiber for end lighting purposes.

In recent years, there has been an interest in having a fiber optic that is efficient in maximizing the light output along the longitudinal axis to create a "glowing rod" effect that emulates a cathode tube, such as a fluorescent light. One problem has been that fiber optic conduits have not been able to create the intensity needed to be used in functional lighting applications as opposed to decorative type lighting.

Standard cathode lighting used for functional purposes generally requires some type of holder and/or reflector or lens to achieve the desired effect. One such example is in illuminating refrigerator interiors where the primary light target is at the front of the shelves. The cathode lamp output is very diffused and the refrigerator manufacturers presently use higher wattage lamps and special holder and/or reflectors to direct the amount of light required on the desired target area. However, higher wattage lamps result in higher heat output which is undesirable, because the refrigerator cooling elements may expend additional energy in order to compensate for the added heat.

Edge lighting with etched glass is another type of lighting which can be achieved with cathode tubes. However, one problem with this type related to efficiently directing the light into the edge of the glass, where the surface is typically ¼ inch to ½ inch wide. This small area limits the ability of the cathode tube, even aided by a holder and/or reflector, to direct the light into the glass because the cathode tube is often the same width of the glass or larger, hence preventing a holder and/or reflector from focusing the light from the back side of the tube into the glass. Higher wattage lamps are required to achieve the desired illumination of the glass wasting even more light which is directed off away from the glass edge.

Many other problems exist with conventional linear functional and decorative lighting systems. Lamps are typically easily broken and eventually need to be replaced, thus the lamps must be installed in a protected chamber that must also provide access for lamp changing thereby creating construction and maintenance problems. Lamps typically cannot be bent or shaped easily and contain electrical components that can produce problems such as electrical shock or fire hazards, hence more complicated system designs are required to accommodate conventional lighting systems.

Many attempts have been made over the last several years to create a directional fiber optic light conduit that would provide a commercially acceptable side lighting as a light source to replace conventional linear lighting, such as cathode lighting. In U.S. Pat. No. 5,432,876, Appledorn discloses the creation of various cuts and notches that can be used to achieve back lighting as an alternative to conventional fluorescent light fixtures, but not as an alternative for direct lighting. One problem has been obtaining adequate brightness and directionality to achieve useful end product for direct lighting purposes.

An example of a directional fiber optic light conduit, commercially available from Lumenyte International Corporation in Costa Mesa, Calif., as "Clear Coat Optical Fiber", is disclosed in U.S. Pat. No. 5,067,831, issued to Robbins. When this product is used with a reflective "U" channel holder and/or reflector, the optical fiber conduit emits light out of its longitudinal sides, but the amount of light available, while fit for its intended purpose, is not enough to be useful for functional lighting applications.

Another example is disclosed in U.S. Pat. No. 4,422,719 issued to Orcutt. Orcutt describes an optical distribution system comprising essentially a fiber optic with cuts or bubbles made in the core and cladding, causing the light traveling down the optic to be interrupted and directed "outwardly." Although this is an improvement over an optical fiber conduit that has no cuts, the invention, as described, does not appear to create sufficient lighting for functional applications. Additionally, the product, as disclosed appears to be susceptible to damage by water and dust because the cuts are open to the environment in which the product is placed.

In U.S. Pat. No. 4,067,831, Robbins discloses the method of coating the optical fiber in a protective clear jacket that protects the optic fiber from damage, but when the light is projected outwardly from the cuts, a holder and/or reflector, on the opposite side of the jacket, has little effect on the overall intensity of light being projected outwardly from the cuts. While this product is fit for decorative lighting it fails to efficiently deliver sufficient light needed for functional lighting applications.

Another problem has been adequate resistance to fire. While the optical fiber does not prevent the dangers of electrical shock or fire hazard caused by conventional lighting systems, conventional fiber optic light conduit is manufactured using combustible materials. It is therefore desirable to have a fiber optic light conduit that is resistant to fire.

DISCLOSURE OF INVENTION

It is a broad object of the present invention to provide an optical fiber conduit having improved optical efficiency.

It is a further object of the present invention to provide a linear optical fiber conduit having a directionally controlled, generally uniform optical light output along its length.

It is another object of the present invention to provide an optical fiber conduit that is fire resistant.

It is yet another object of the present invention to provide an optical fiber that is flame retardant.

It is an advantage of the present invention to provide application specific lighting by varying the properties of light directed out of the conduit.

It is another advantage of the present invention to provide a holder and/or reflector within the optical fiber conduit to increase the amount of light output along the conduit's length.

It is a further advantage of the present invention to provide a holder and/or reflector sealed within the optical fiber conduit to protect the holder and/or reflector and optical fiber from loss of illuminance caused by moisture, water or dust and changes in the orientation and spatial relation of holder and/or reflector and optical fiber.

The present invention relates generally to a linear optical fiber conduit having an optical fiber core surrounded by a cladding. A plurality of illuminators is formed from notches and/or cuts, generally uniform in depth and alignment, made along a side of the fiber core and in predetermined intervals spaced apart at varying intervals. The spacing between the cuts varies in relation to the length of the conduit and the distance of the spaced apart cuts from the light source. The side of the conduit which is the side in which the cuts are made is defined either discretely or continuously by a machine and/or human readable reference along the length of the conduit to ensure all of the notches and/or cuts are aligned with each to the other.

The cladding covered optical fiber core is received within a holder and/or reflector comprising a channel formed from reflective material centered adjacent to or in contact with the plurality of illuminators. In one embodiment, the holder and/or reflector is not contour fitting, instead air gaps are maintained linearly along opposite side of the cuts. In alternative embodiments, the channel material may be composed of fire resistant and/or flame retardant materials that may prevent the spread of fire through the air gaps. The channel is aligned with the cuts and/or notches according to the first and/or a second reference that is defined along the length of the conduit.

Optical elements that adjust the light output may be included and are oriented in alignment with the cuts and/or notches. Such optical elements may include lenses, filters, diffusers and/or holographic films. These optical elements along with the illuminators and holder and/or reflectors are aligned in preferred orientation by establishing a reference detail along the length of the conduit. A jacket, surrounding the holder and/or reflector and cladding covered optical fiber core, maintains the alignment of the optical core within the holder and/or reflector and prevents moisture, water, fire and dust from entering the air gaps formed between the holder and/or reflector and the optical fiber core. One end of the optical conduit is connected to a light source in a conventional manner so as to cause total internal reflection of the light into the optical conduit. A reflective end piece is connected to the opposite end so as to redirect any light back through the conduit.

An optical fiber conduit, thus described may also be useful, having fire resistant and/or flame retardant properties in specific functional direct lighting applications such as core lighting, identification exits or indirect lighting uses wherein it is desirable to minimize the risk of fire.

The objects and advantages of the present invention will become more readily apparent to those of ordinary skill in the art after reviewing the following detailed description and accompanying documents wherein:

BRIEF DESCRIPTION OF DRAWINGS

FIG. 10 is a cross-sectional view of optical fiber conduit taken along line 10—10 of FIG. 9;

FIG. 11 is a cross-sectional, broken side view of an optical fiber conduit having an optical element;

FIG. 12 is a perspective view of an alternative embodiment of optical fiber conduit;

FIG. 13 is a cross-sectional view of an alternative embodiment of optical fiber conduit;

FIG. 14 is a cross-sectional view of an alternative embodiment of optical fiber conduit;

FIG. 15 is the cross-section view of the optical fiber conduit of FIG. 10 secured in a bracket;

FIG. 16 is a cross-sectional view of an alternative embodiment of optical fiber conduit.

BEST MODE FOR CARRYING OUT THE INVENTION

Figure 1:
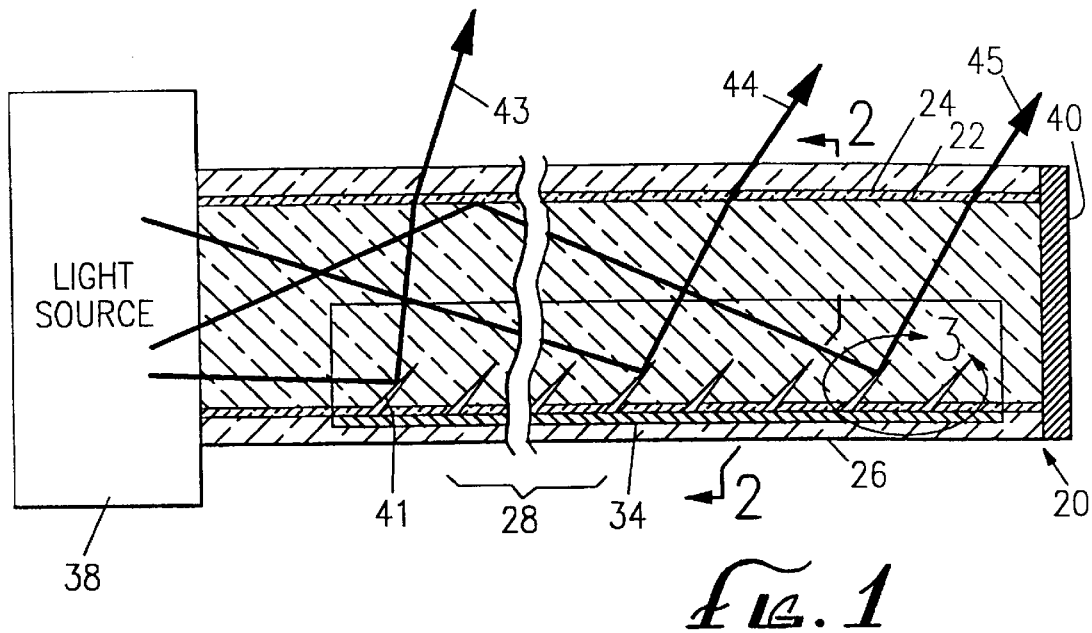
FIG. 1 is a cross-sectional broken side view of an optical fiber conduit of the present invention.

Referring to the drawings more particularly by reference numbers, the optical fiber conduit 20 (FIGS. 1–2) used for side lighting illumination in general comprises the known combination of a central, optical fiber core 22 surrounded by a cladding 24 which in turn is surrounded by a jacket 26. U.S. Pat. No. 5,067,831, which is incorporated by reference herein, discloses this configuration, including materials of the type preferred for the optical fiber core 22 and cladding 24 and a method of manufacture thereof. The core preferably is made of the type manufactured by Lumenyte International Corporation of Costa Mesa, Calif., under model numbers SWN-500, SWN-400, OU-400, WN-500, SL-500 and SL-400 where presently model number SWN-500 is most preferred.

Figure 2:
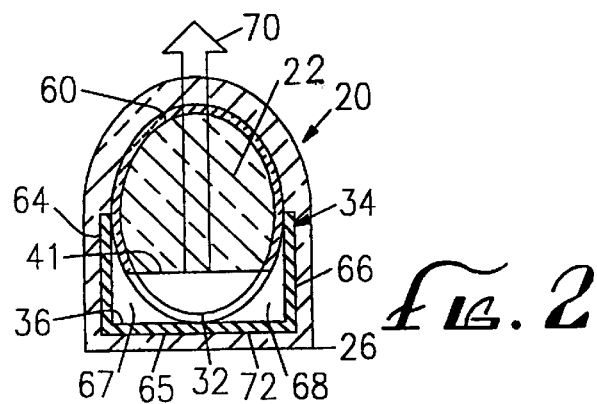
FIG. 2 is a cross-sectional view of the optical fiber conduit of FIG. 1 taken along line 2—2.
Figure 4:
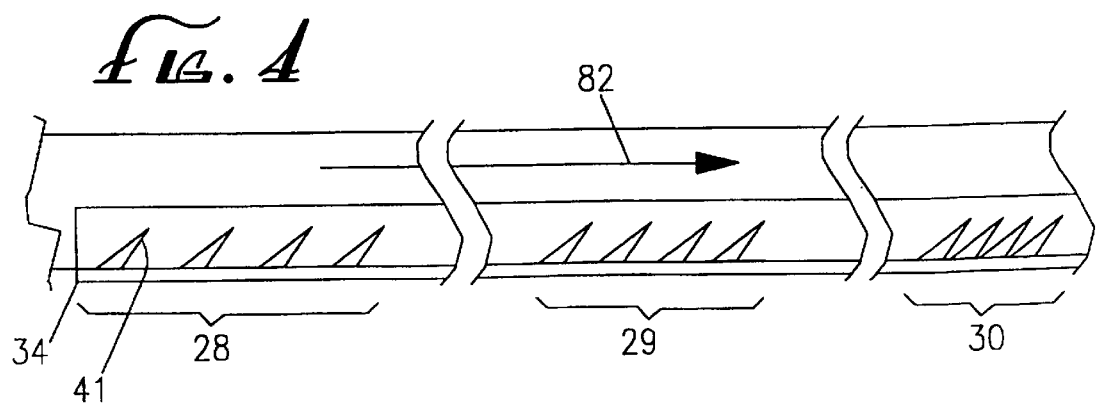
FIG. 4 is a diagrammatic broken side view of the optical fiber conduit having illuminators positioned at discrete varying intervals.

Advantageously, the optical fiber core and cladding include a plurality of illuminators 28–30 (FIGS. 1 and 4) of uniform size and shape positioned in a predetermined, spaced-apart relation, linearly, along a side 32 of the optical fiber core shown as the bottom side in FIG. 2. The optical fiber core 22, surrounded by the cladding 24, is received in a track and/or holder and/or reflector 34 comprising a channel constructed with a reflective interior surface 36 (FIGS. 1, 2 and 7) centered about the plurality of illuminators 28–30. The holder and/or reflector 34 is positioned adjacent to or in contact with the plurality of illuminators. A light source 38 (FIG. 1) is connected at one end of the optical fiber conduit in a conventional manner so as to cause a TIR effect. The end of the optical fiber conduit opposite the light source may include a reflective surface 40 for reflecting back towards the light source any light remaining in the optical fiber conduit. For longer spans of optical conduit, the conduit may include a second light source 38.

Figure 3:
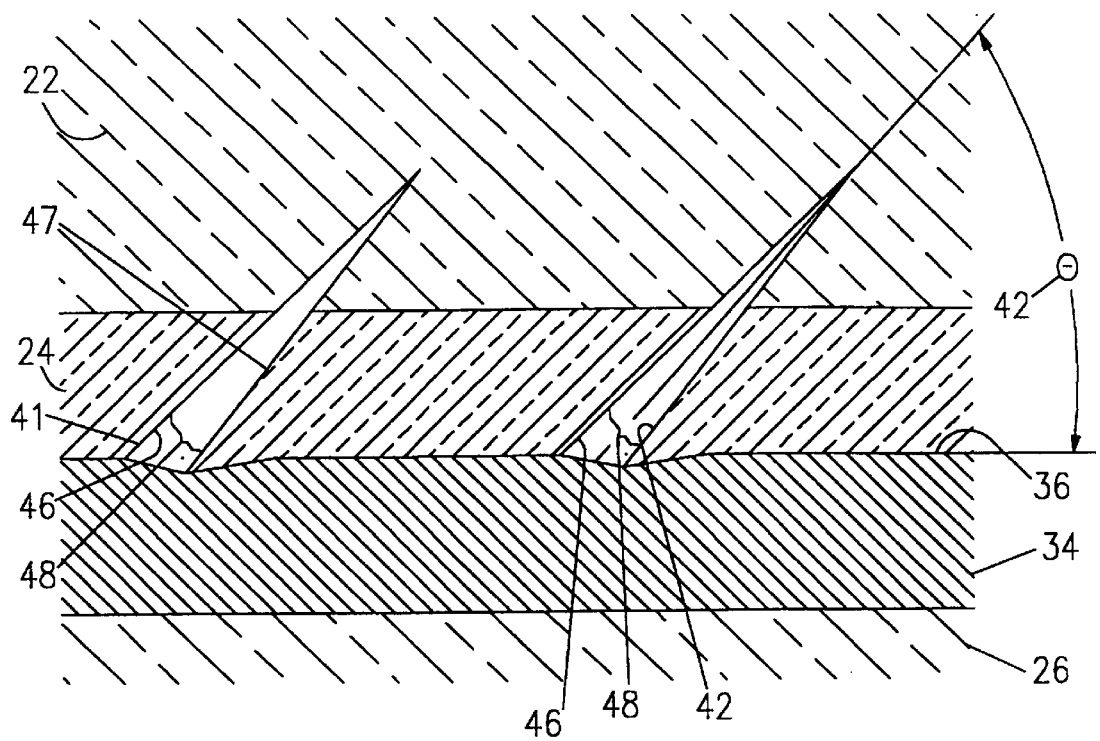
FIG. 3 is an enlarged view of the optical fiber conduit of FIG. 1 encircled by line 3—3.
Figure 9:
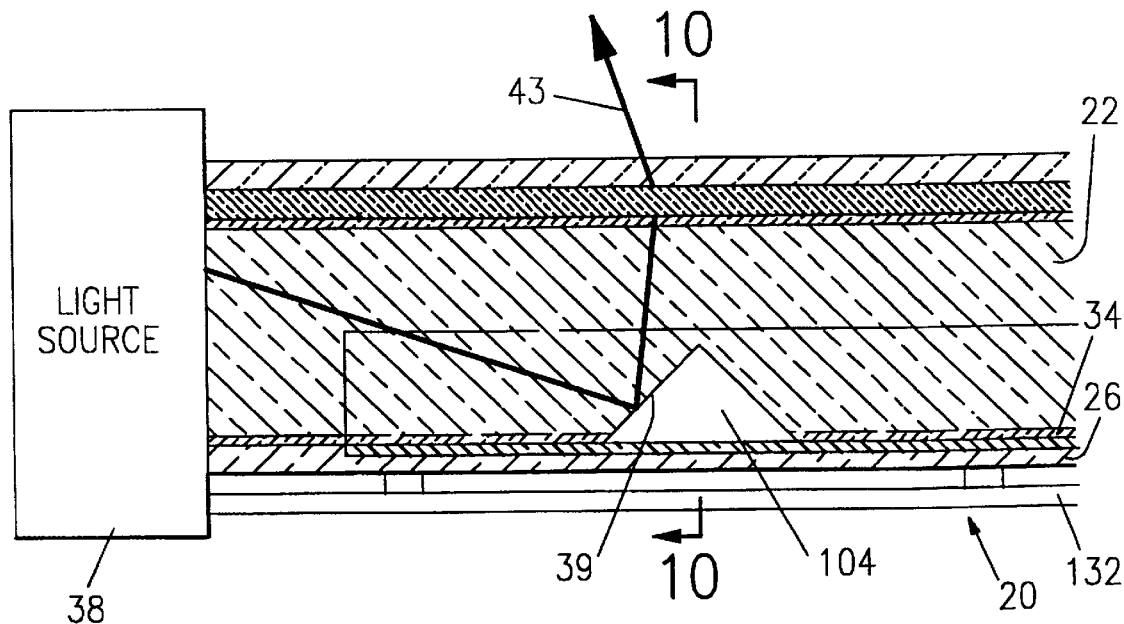
FIG. 9 is a cross-sectional, broken side view of an alternative embodiment of optical fiber conduit.

With reference to FIGS. 3, 9 and 11, the illuminators, in general, may comprise any non-uniformity, constructed into the optical fiber core, that reflects or refracts light such as, for example bubbles (not shown), reflective material (not shown) formed in the core during fabrication. Also, notches 39 made from two cuts in the core to remove a wedge of material or singular cuts 41 made in the core following fabrication preferably function as the illuminators. The preferred illuminator is a notch or cut made in the optical fiber following fabrication. Unlike decorative lighting in which any light transmitted from the optical fiber core is desirable regardless of focus and/or intensity, functional lighting applications require that the light be directed towards an area in which illumination is desired, and the light output efficiency of the conduit to be maximized.

Figure 8:
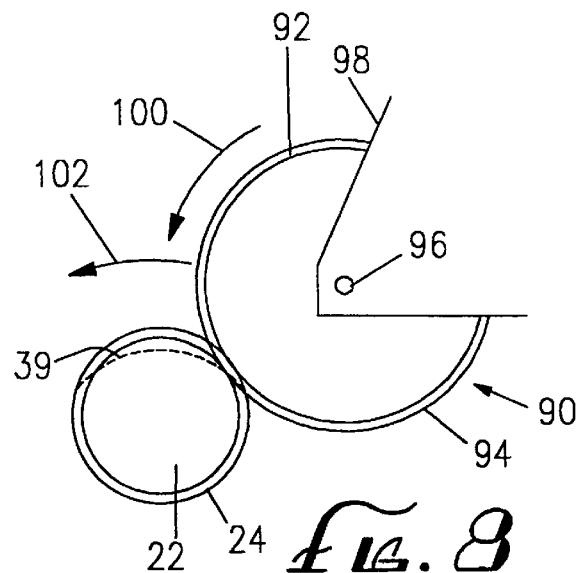
FIG. 8 is a diagrammatic view of a cutter forming a cut in the optical fiber conduit.

In the preferred embodiment, the illuminators are made in the core following fabrication. As illustrated in FIG. 3, the illuminators are uniform cuts 41 formed by a conventional mechanical cutter. Preferably, the illuminators are formed from notches 39 (FIGS. 9 and 11) performed by a cutter 90 (FIG. 8) which is capable of cutting the core uniformly and leaving a smooth, texture-free surface. A cutter suitable for this purpose desirably cuts the core without tearing or burning the material. A cutter of this type comprises a circular disk shaped knife 92 having a smooth, tooth-free blade 94 that is freely rotatable about an axle 96 located at the center of the disk. An arm 98, connecting to a handle or other conventional machinery, secures the blade. Preferably, the blade rotates about the axle as illustrated by force line 100 while the axle is moved in relation to the circumference of the core as illustrated by force line 102. The blade 94 is angled at 45 degrees relative to the longitudinal axis of the core. Two cuts are made to form, preferably, a 90 degree notch 39 (FIGS. 9 and 11) in which material is removed from the core and having a crescent shape 39, FIG. 8 when viewed from cross-section. The blade 94 cuts along the core to form a notch 39, but does not tear the core material. The notch 39 functions as an illuminator by maximizing the TIR effect of light within the core 22. This is due to the core 22 having a different index of refraction from the ambient air 104 (FIGS. 9 and 11) in the notch 39 which directs the light across the core and out the opposite side of the core as shown by arrow 43. Different lighting effects may be achieved by replacing the ambient air 104 with other gases or compounds. Imperfections in the cut may direct some light into the notch 39. This light desirably reflects off of the holder and/or reflector and back through the core. Alternatively, where cuts are preferred over notches, the cut is, preferably, made at a uniform depth of ⅛ inch into the cladding 24 and core 22, and, preferably, at a 45 degree angle "theta" 42 (FIG. 3) from the horizontal, i.e., longitudinal axis of the optic. This appears to cause the light to exit perpendicular to the optic's longitudinal axis of the optical fiber where the optical fiber core may have an acceptance angle of approximately 81 degrees to allow light to exit. The path of the light is illustrated in FIG. 1 by lines 43–45. The surface of the sides 46 and 47 (FIG. 3) of the cut is preferably smooth rather than rough to ensure light is refracted uniformly. The cut preferably forms a wedge which has a gap 48 sufficient to prevent contact between the sides 46 and 47 of the cut during normal use. Such contact would reduce the light reflecting and/or refracting properties. In this embodiment the cuts 41 are less efficient than the notches 39 in relying on TIR to force light out of core. The holder which affixes the optic in desired alignment also acts as a holder and/or reflector.

When the optical fiber is round in cross section and placed in a nonconforming holder such as a rectilinear "u" channel where an open space is created at the bottom of the "u", cuts made in the optic that come in close proximity to the bottom of the "u" maintain this configuration. It has been found that when a conforming holder is used, the cuts tend to close and alter the configuration such that efficiency of light extraction is reduced. It has been found that when using a conforming holder, the preferred embodiment includes illuminators made with notches sufficient to maintain an open space between the holder and notched surface.

Another embodiment for cutting notches 39, consists of a high speed drill motor (not shown) with a cutting blade sufficient to make a notch in the optical fiber such that the surface created with the notch to be smooth enough to allow total internal reflection to take place.

Alignment of illuminator or illuminators with respect to the holder determines the directionality of the light output emitted from the optical system. It has also been discovered that the shape of the cut effects the output beam pattern of the optical system. The wider the cut, the wider the output beam pattern.

As with all linear fiber optics as light is extracted from lengths of the fiber near the light source there is less light available in subsequent lengths and this phenomenon must be considered in the manufacturing process. In order to achieve uniform lighting from the optical fiber conduit, the frequency with which the illuminators occur increases non-linearly in relation to the length of the conduit and the distance of the illuminators from the light source. In other words, the illuminators are closer together as the distance from the light source increases. This is to compensate for the attenuation of the light due to the loss experienced from the illuminators and the natural attenuation of the optic itself. The spacing can be made progressively closer which is the preferred method, or in groups of spacing in which the groups progressively get closer but the distance between individual illuminators within each group remains constant. This technique is preferred over making illuminators with progressive depths to make the optic transmit light evenly along its length. When illuminators are made progressively deeper, the light pattern is altered. The deeper the cuts, the wider the light pattern becomes. When illuminators are made progressively closer, the light pattern remains the same and the light output is made more even. Near uniformity of light output along the length of the conduit is achieved in part due to the changes in the spacing of the illuminators and in part due to the uniformity of the size and angle of the illuminators. A mechanical cutter is particularly well adapted to provide such uniformity.

Figure 6:
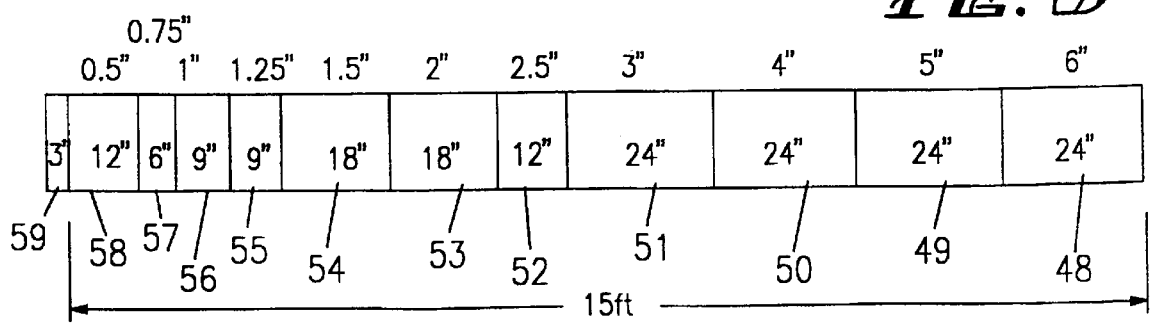
FIG. 6 is a diagrammatic view of an embodiment of the optical fiber conduit illustrating the discrete changes in the spacing of the illuminators.

As illustrated in FIG. 6, while continuous variations in the frequency of the cut spacing is preferred, the cutter of the present invention should be adaptable to vary the frequency of the spacing at discrete intervals to minimize delays during adjustment of the spacing interval. Thus, with reference to the FIG. 6 embodiment, for example, a 15 foot section of cladding covered optical fiber core for use with a 60 watt light source placed at the right side, adjacent segment 48, is divided with twelve segments 48–59. The first four segments 48–51 (8 feet in total length) receive illuminators with 6, 5, 4, and 3 inch variations in spacing within each of the four segments, respectively. Thus, the spacing between each illuminator in segment 48 is 6"; in segment 49 the spacing is 5"; in segment 50 the spacing is 4"; and in segment 51 the spacing is 3". The next three segments 52–54 comprising four feet in total length receive cuts with 2.5, 2, and 1.5 inch distances between each cut within each of the three segments respectively. Thus, the spacing between each cut in a 1 foot segment 52 is 2.5 inches; in an 18-inch segment 53 is 2.0 inches; and in an 18-inch segment 54 is 1.5 inches. The next four segments 55–58 comprising 3 feet in total length receives 1.25, 1.5, 0.75 and 0.5 inch variations in spacing within each of the four segments respectively. Thus, the spacing between each cut in a 9 inch segment 55 is 1.25"; in a 9 inch segment 56 is 1"; in a 6 inch segment 57 is 1"; and in a 12" segment 58 is 0.5". A final 3 inch segment 59 in addition to the 15 feet receives no cuts. The 3 inch segment is optional, but is desirable when splicing the ends of the cable. It will also be appreciated that for longer lengths of cable utilizing a light source at each end of the cable or both ends connected to the same light source. The small interval illuminators would occur near the middle of the cable, farther from the light source, and where the light output would otherwise be dimmer. In accordance with the principles of the invention, the number of illuminators, and the distance between each illuminator is made in order to achieve the desired degree of uniformity of light output along the length of the optic.

Although the illuminators could be made in optical fiber core 22 alone before the cladding 24 is added, the illuminators are preferably made in the cladding 24 and the core 22 after it has been surrounded by the cladding 24. This technique is preferred because when the cladding 24 is heated to tightly shrink around the core 22, the cladding may affect the uniformity of the illuminators in the core 22 by either entering the notch (FIGS. 9 and 11) or closing the cut (FIG. 3) thereby reducing the potential light deflecting properties of the illuminator.

The illuminators 28–30 are preferably positioned to direct light across the greater diameter of the elliptical optical fiber core 22 out the region 60 as shown with arrow 70 in FIG. 2, opposite from each of the respective illuminators 28–30. This may be accomplished by angling the notches 39 and/or cuts 41 to direct light from the light source through the optic core. The illuminators allow better control of escaping light by making the notches 39, which are positioned on one side of the optic to direct the light rather than allowing the cuts to reflect/refract light in various directions which reduces the contribution of light to a desired focusing effect.

Optical element(s) 106 (FIG. 10) such as diffuser(s), polarizer(s), magnifying lens(es), prism(s), hologram(s) or any other element capable of modifying the direction, quantity or quality of the illumination, individually or in combination can also be added and aligned with the core-clad, notches and track or holder and/or reflector. The optical elements may be formed as separate components 106 or formed integrally with the core 108 (FIG. 12), cladding and/or a jacketing 110 (FIG. 11) material or in any combination of separate and integrally formed components. Optical elements formed integrally in the core 108 (FIG. 12) and cladding of various shapes creates a lens and thereby specifically affects the directionality of light from the finished product. Different optical fiber shapes create different output beam patterns. Round fiber optic (FIG. 7) creates a wider beam spread of light. For example, the beam spread has been determined to be approximately 50° to 60° in samples having a circular cross-section. In an oval shaped optic (FIG. 2), (approximately 6 to 4 ratio) a beam spread of approximately 20° to 30° results. It is believed that a wedge shaped optic (FIG. 12) produces a collimated light beam spread. This beam spread is due to what is believed to be a lensing effect. It is believed that the depth of the cut must be sufficient to at least intersect the focal point of the lens 60 formed by the curvature of the optical fiber core where the light exits the core. An optical fiber core, cylindrically shaped when viewed in cross-section, forms a lens 62 (FIG. 7) that diffuses the light over a wide field of illumination. An optical fiber core, oval or elliptically shaped when viewed in cross-section, forms a lens 60 (FIG. 2) that increases the intensity of the light within a narrower field of illumination. An optical fiber core, wedge shaped when viewed in a cross-section, forms a lens 108 (FIG. 12). It will be appreciated that other shapes may be used because of their desired optical characteristics to also act as optical elements. Alternative optical elements 106 (FIG. 10) may also achieve various lighting effects by including a separate optical element 106 (FIG. 10) in alignment with the holder and/or reflector and the arc 112 formed by the notch 39 on the opposite side of the optic from the optical element. The lens 106 optic, notch 39 and holder and/or reflector 34 are all aligned to direct light out of the optic 22 and into the lens 106. The optical element 110 may also be formed integrally in the jacketing material (FIG. 11). The jacket thickness may be adjusted to achieve a desired lighting effect. Alternatively, cylindrically shaped diffusers 114 and 116 (FIG. 16) may be included and aligned to generate other desired lighting effects. In one instance a first diffuser 114 may lower the intensity of light passing through it and a second diffuser 116 may increase the intensity of light passing through the second optic fiber. The two diffusers 114 and 116 as thus described, would modify the intensity of light as it transmits and diverges away from the optical fiber. In order to best make use of this kind of application specific optical lighting, it is necessary to control the alignment of the illuminators 39 or 41, holder and/or reflectors 34 and optical elements 106. For most applications, the alignment of these elements is centered about a diameter 118 as shown in FIG. 15, the diameter 118 of the fiber optic core being the diameter from and perpendicular to the center of the holder and/or reflector. It is desirable to maintain control of this alignment along the entire length of the optical fiber conduit. Initially it was assumed that the manufacturing process inherently maintained the alignment of these components. However, it has been discovered that even slight variations in the composition and structure of the optical fiber conduit along its length can cause slight twisting of the various components relative to each other thereby disturbing the lengthwise orientation.

It was discovered that by using a machine, or human readable references marks placed discretely or continuously along the length of the fiber optic, movement of the components relative to each other and the reference could be identified and corrected. In long length conduit where lumen loss becomes more critical, the need to maintain the alignment of these components also becomes more critical. In one instance the reference may be a human and/or machine readable line (not shown) drawn by a grease pencil along the length of the conduit. The reference ensures that each notch 39 cut into the core and cladding material is centered about the same line, and intercepting the same diameter of the optic. Afterwards, the grease pencil reference may be wiped from the surface as the series of precision notches 39 forms the reference by which the holder and/or reflector 34 and optical element 106 are aligned. Other machine readable references may include a pair of directed light beams or lasers projected through the conduit, magnetic tape or physical marks formed in the cladding 24. Each of these indicators alone or in combination along with the grease pencil and illuminators 34 or 41 may be used as references. Each reference alone or in combination functions as a means for orienting the components of the optical fiber conduit during assembly. Other equivalents now known or later conceived of as a reference for a machine readable system could also function as another means for orienting the relative alignment of the components along the entire length of optical fiber conduit.

Where the references comprise physical dimples 120–122 (FIGS. 13 and 14) formed in the cladding material, the references may be used to guide and/or retain the holder and/or reflector 34 (FIG. 14) and 124 (FIG. 13) against the core 22 and cladding 24. In one embodiment (FIG. 14) two dimples 121–122 formed in the cladding 24 function as stops to guide the "U" shaped holder and/or reflector 34 in alignment with the core 22 and cladding 24 of the optic. The dimples 121–122 rest against the outer edges of the holder and/or reflector 34. An alternative embodiment (FIG. 13) includes one dimple 120 formed in the cladding 24 of a fiber optic. A "C" shaped contour fitting track 124 includes a bracket 126 to attach to a wall or the like. The inner surface of the track 128 includes a recess 130 which receives the dimple 120 formed in the cladding 24. In this embodiment, the reference components allow for the assembly of the track and/or holder and/or reflector 124 with the optic 22 at the site where the lighting fixture is to be installed. The dimple 120 and the contour fitting track 124 lock the optic core 22 into the conduit 124 such that the illuminators 39 are aligned with the opening in the track 124 and, optionally, with any optical elements which are all aligned to direct light through the opening in the track. The contour fit also serves to keep dust out of the illuminators 39. Preferably, this embodiment has notches 39 functioning as illuminators, because the cuts 41 (FIGS. 1 and 3) tend to close causing a loss of light extraction difficiency with contour fitting track.

Located adjacent to or in contact with the illuminators 28–30 (FIG. 4), the holder 34 includes a "U" shaped channel. The holder 34 may include any material that reflects visible light with minimal absorption to function as a reflector. Thus, a first surface mirrored material to produce the greatest light output is desirable, but is less preferred to manufacture due to cost. The presently preferred light reflecting material for producing the holder 34 is white pigmented polymeric material because it has shown good reflective characteristics even though there is some loss in efficiency. The white polymeric materials are relatively low in cost and have the desired flexibility to bend with the optical fiber core. Any type of white pigmented material may be used.

Figure 7:
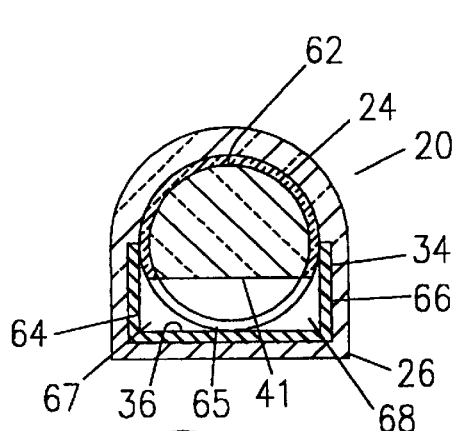
FIG. 7 is a cross-sectional view of an alternate cylindrically shaped optical fiber conduit.

The holder and/or reflector 34 is preferably constructed as a three sided 64–66 rectangular channel as shown in FIGS. 3 and 7. The rectangular shape of the holder and/or reflector in combination with the curved shape of the optical fiber core forms air gaps 67–68 between the holder and/or reflector 34 and the optical fiber core. The bottom surface 65 of the holder and/or reflector forms a plane that is positioned adjacent to or in contact with the curved surface of the optical fiber core tangential to the surface at the core's greatest diameter, about which is centered the plurality of illuminators 28–30 such that light refracted off the illuminators travels through the optical fiber core in a direction, ideally, perpendicular to the holder and/or reflector bottom surface when viewed from a cross-section as shown by line 70 in FIG. 2. It should be noted that line 70 does not necessarily impart or suggest the type of beam spread of the light which may converge or diverge relative to line 70. It has been found that maintaining the holder and/or reflector 34 as close to the illuminators 28–30 as possible, without touching, maximizes the efficiency of the light output. However, contact, especially forceful contact, between the holder and/or reflector and the illuminators can be harmful, because a tightly fitting or contour fitting holder and/or reflector tends to force the sides of the cuts to close, thereby degrading the light output with cuts functioning as the illuminators. Thus, with cuts functioning as illuminators, the rectangular-shaped holder and/or reflector 34 may be preferred over a contour fitting elliptical holder and/or reflector for this reason and also due to the ease of assembly of the holder and/or reflector 34 with the optical fiber core. The shape of the holder and/or reflector 34 is particularly useful when aligning the holder and/or reflector with an oval shaped optical fiber core 22 having the illuminators positioned along one of the sides 72 defined by the greatest diameter of the elipse.

The optical fiber conduit is completed with a transparent or translucent jacket 26 is preferably extruded over the holder and/or reflector 34 and cladding covered optical fiber core 22. It is noted that other methods of manufacturing the jacket will work as well. The jacket isolates the air gaps 48 within the cuts and the air gaps 67 and 68 between the holder and/or reflector and the optical fiber core from the environment in which the conduit is placed.

In the embodiment where the illuminators are formed from cuts (FIGS. 1 and 3), this process prevents the cuts from being damaged or exposed to dust, while allowing the cuts to be open containing an air interface. This air interface appears to cause high angles of light to refract/reflect off the cut surface and bounce out causing greater efficiency from the cut surface than if it had a cladding with a higher index of refraction which would let the high angle light rays pass through and not be reflected. Some of this light passing through the cladding appears to be absorbed, both when leaving the cut surface and re-entering the cladding after reflecting off the reflective surface.

In embodiments where the illuminators are formed from either cuts 41 and/or notches 39, the jacket 26 further ensures that holder and/or reflector 34 is maintained in alignment with the illuminators in the optical fiber core 22 and optionally with optical elements to maintain uniformity of direction of the light produced along the length of the fiber core. The jacket 26 may further be formed with and/or attached to brackets 132 (FIGS. 9, 14 and 16) which secure the optical fiber conduit to a desired surface. Preferably the bracket 132 is also in alignment with the holder and/or reflectors 34, illuminators 39 and optical elements 106. By ensuring the alignment of these elements, the optical fiber conduit may be used to efficiently direct light in a variety of application specific lighting arrangements where direct light is desired.

In one embodiment, the bracket is formed integrally with the jacketing material. An alternative embodiment includes an external bracket 136 (FIG. 15) having a connector 138 in the form of an alligator clip for attaching the bracket 136 to a desired surface 140. The rectilinear shape of the jacket material 26 when formed about the "U" shaped holder and/or reflector 34 provides the reference or orienting means for aligning the jacket 26 with a "U" shaped hook 142 formed in the bracket. The bracket 136 may include a connector 138 of any conventional type, although an alligator clip attachment allows for movement or later adjustments to the location of the optical conduit. This would be desirable in advertising displays where variations in lighting are desirable.

Figure 5:
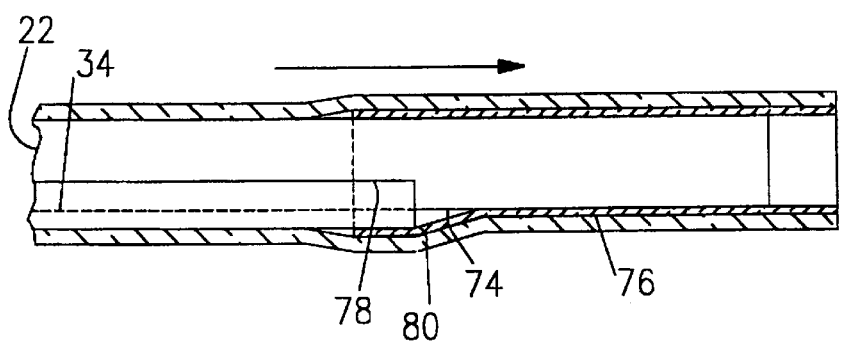
FIG. 5 is a partial cross-sectional view of an end of the optical fiber conduit.

During assembly of the optical fiber conduit illustrated in FIG. 5, the cladding covered optical fiber core includes a portion 74 that extends out beyond the end of the holder and/or reflector. A second cladding 76 preferably about 4 inches in length surrounds the uncovered free end 74 of the optical fiber conduit and the end portion 78 of the holder and/or reflector 34. The portion of cladding surrounding the leading edge 80 of the holder and/or reflector is heated to shrink about the holder and/or reflector end. This process is repeated at each end of the optical conduit and secures the holder and/or reflector to the optical fiber core in preparation for extruding the jacket 26 over the holder and/or reflector and optical fiber core assembly. The second cladding 76 prevents the holder and/or reflector 34 and optical fiber core 22 from shifting in their alignment during the formation of the surrounding jacket 26 by extrusion.

Figure 17:
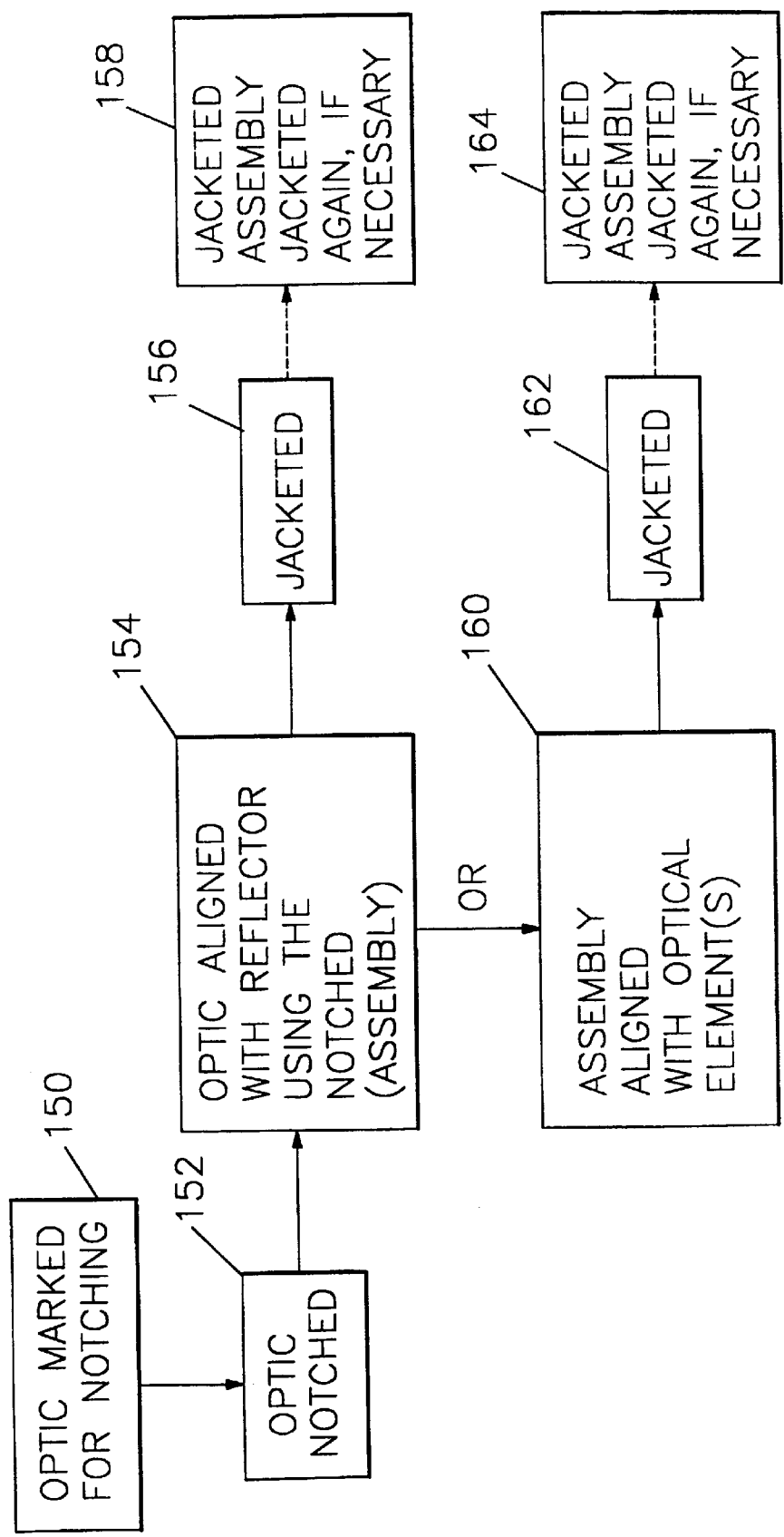
FIG. 17 is a process block diagram.

In the process of manufacturing the optical fiber conduit, it is desirable to control the relative orientation of components. One method (FIG. 17) to ensure the orientation includes the step 150 of first marking the optic along its length, with for example a grease pencil, to set a reference to determine the placement of each of the illuminators. Generally, it is desirable that the illuminators are aligned uniformly and in a straight line along the length; however, some applications may require the alignment to vary depending upon the desired lighting application. The optic is then notched at step 152, preferably with a relatively smooth surface. The mark on the optic is erased and the illuminators are then used as the reference for aligning the optic with a holder and/or reflector at step 154. The aligned holder and/or reflector and optic are then input to an extruder. During this extrusion step, the extruder forms a jacket material over the components, thereby fixing their relative orientation at step 156. The jacket may contain optical elements in which case the jacket would also be aligned with the illuminators and the holder and/or reflector. The jacket may also contain fire retardant and/or flame resistant material that may be included alone or in combination with the optical elements. Additionally, a second jacket may optionally be extruded over the conduit. The second jacket may contain optical elements and/or flame resistant or fire retardant materials or both at step 158. An outer jacket may include brackets which are also aligned with the holder and/or reflector and illuminators.

Alternatively, after the optic is aligned with the holder and/or reflector, optical elements including lenses, filter diffusers, holographic film may be aligned with the illuminators and holder and/or reflector at step 160. The aligned holder and/or reflector, optic having illuminators and optical elements are then input to an extruder and jacket material is extruded over the components thereby fixing their relative orientation within the jacket at step 162. Multiple jackets may be added to provide additional optical elements and/or fire resistant and/or flame retardant properties, including an outer jacket having a bracket aligned with the optical elements, illuminators in the optic and the holder and/or reflector at step 164.

After the jacket 26 has been extruded the conduit is ready for installation. For shorter lengths of conduit or high wattage light sources, the conduit is attached to a light source 38 (FIG. 1) such that the cuts extend preferably 45 degrees from horizontal away from the light source (FIG. 1) and path of the light illustrated as line 82 in FIG. 4. Other angles between 0 and 90 degrees may be used, but 45 degrees is most preferred for most applications. A reflective first surface mirror 40 is placed at the distal end away from the light source having surface preferably offset 10 to 20 degrees from perpendicular to the longitudinal axis of the conduit (not shown). Although no offset is required to perform adequately, the offset changes the angles of the returning reflected-returning light to increase the opportunity for the recycled light to intersect an illuminator. For longer lengths of cable a second light source may be placed at the opposite end to increase the available light for distribution through the holder and/or reflectors.

It has been found that a first surface mirror 40 is preferable to a white surface, especially when the end is cut at an angle, because the white surface allows light to pass out the end, scatters the light and also absorbs light, whereas the mirror reflects a higher percentage of light back into the optic where it is reflected/refracted as described above. The mirror surface reflects the light rays back into the optic with less diffusion than the white surface and thereby helps to create a more even light rather than a bright spot at the end. A retro holder and/or reflector was tried with similar effects to the mirrored surface, but the heat from the infrared radiation transmitted through the optic from the light source caused failure of the retro holder and/or reflector.

In some uses the optical fiber conduit may be located near combustible or explosive materials or incorporated into the engine compartment of an automobile. When used in these types of applications, the conduit must be capable of meeting various governmental and industry standards. For example, in military applications where indirect fiber optic light is preferred over conventional light fixtures, the fiber conduit ideally should be capable of meeting the governmental standards for flammability, toxicity and smoke. An example of a flammability standard is the Institute of Electrical and Electronic Engineers (IEEE) Standard 383-1974. An example of a toxicity standard is the Naval Engineering Standards (NES) for the United Kingdom, Standard NES-713. An example of a smoke standard is the Naval Engineering Standards (NES) for the United Kingdom, Standard NES-711. The United States Department of the Navy has adopted the IEEE 383-1974, NES-713 and NES-711 standards for fiber optic conduit in explosion proof rooms such as shipboard magazine compartments. Light producing materials for these applications are tested within the temperature range of −60° F. to +300° F.

In addition,, separate standards exist for fiber optic conduit when used in the engine compartment of an automobile. A set of proposed standards for such an application are discussed in General Motors specification entitled "Fiber Optics For Underhood Applications".

It has been discovered that use of flame retardent and/or fire resistant materials in fiber optic conduit of the type described herein may be manufactured and used generally in such environments where flame retardant properties are desirable. In one such embodiment the jacket 26 may be manufactured from a flame retardant and/or fire resistant material. The flame retardant properties will vary according to jacket 26 thickness but generally it is desired that the material shield, the underlying core 22, cladding 24 and holder and/or reflector 34 for such a purpose the preferred jacket thickness may vary according to the material used.

A material of the type suitable for this purpose is Teflon® FEP, useful in grades 100 or 100J, in grade 100J being preferred, and manufactured by Dupont Polymers, of Wilmington, Del. Teflon® FEP and its properties are fully described in Dupont Publication No. H-28461-2 entitled "Extrusion Guide For Melt-Processible Fluoropolymers".

Assembly of a jacket 26 formed from Teflon® FEP is suitable for conventional cross-head extrusion techniques. Although in the presently preferred assembly of FEP jackets, the jacket is not extruded rather the material is ordered to a desired size and length. The jacketing material is then placed over the core 22, cladding 24 and holder and/or reflector 34. The jacket 26 may then be heat shrunk onto the fiber optic using conventional heat shrinking techniques.

Another material of the type suitable for a flame retardant jacket 26 is tetrafluorethylene, hexafluoropropylene and vinylidene fluoride (THV) terpolymer manufactured by 3M Specialty Fluoropolymers Department of St. Paul, Minn. THV grades 200 and 500 and 300 are useful although grade 500 is preferred. THV jackets may be manufactured using conventional cross head extrusion techniques. THV and its properties are disclosed in the "3M THV Fluoroplastic Product Information".

It is believed that silicon having a high degree of transparency is also desirable as jacketing material for flame retardency.

Through experimentation it has been discovered that when fiber optics alone are exposed to flames, the optic combusts and the fire/flames propagate rapidly. To prevent the spread of flames along fiber optic, it is desirable to manufacture the holder and/or reflector 34, and/or jacket 26, for example, using flame retardant material. Such materials may desirably include halon gas or other oxygen inhibiting materials to help prevent the spread of flames.

A material of the type suitable for this purpose, for example the holder, is Solef® Polyvinylidene Fluoride (PVDF) manufactured by Solvay Polymers, Inc. of Houston, Tex. Solef® PVDF grades preferred are 31508 and 32008, useful grades include Solvay Solef® PVDF data sheets 32008–0009, main properties and 31508/0009.

The jacketing, holder and/or reflector or optical elements when included as individual components or any combination thereof, and integrated into the system, are preferably selected to impart fire resistance and flame retardancy. Materials are also selected to impart moderate and most preferably low smoke emission. Materials are selected to impart gross calorific value (GCV) of less than 41.5 Kj/kg and preferably 14.7 Kj/kg and most preferably less than 14.7 Kj/kg (according to calorimetric bomb test DIN 51 900 part 3 as published by New York City Board of Standards and Appeals (USA)).

Materials for jacketing, holder and/or reflector or optical elements can also be selected for fire resistance by the criterion of limiting oxygen index. The materials should have an index of at least 19 (thickness: 3 mm), preferably 44 and most preferably 93 and higher.

Materials for jacketing, holder and/or reflector or optical elements can also be selected for lower or no smoke emission in accordancy with ASTM D 662 NBS Chamber test with or without flame. For a 2 mm sample, a Maximum Specific Optical Density (Dm) of 25 without flame, and 270 or lower with flame is most preferable.

FINISHED OPTICAL FIBER CONDUIT EXAMPLES

A couple of samples of optical fiber conduit of the present invention were prepared in accordance with the description set forth above and were subjected to various tests as will be described.

EXAMPLE 1

A six (6') feet long ½ inch diameter oval optic as illustrated in FIG. 2, placed in a white "U" channel holder and/or reflector, coated on the assembly's exterior with clear butyrate plastic, was prepared and photometries were taken. A first surface mirror was put on the end (cut at a nominal 15 degree angle) of the optic and light from a General Electric 60 watt xenon-metal halide lamp was focused into the input end. Each of the cuts was 0.0735 inch deep and slanted at an angle of 45 degrees from the longitudinal centerline of the optic.

Light measurements were taken 18 inches from the optic surface such that light reflected off the holder and/or reflector back through the optic and out with a beam angle of approximately 22 degrees along the optic's longitudinal axis.

The spacing variations were made as groups of progressively closer cuts from 6 inches long groups to 18 inches long groups in an attempt to create even light output along the optic edge. A reading of 60 foot candles was found at 6 inches from the input end; 50 foot candles at the center of the optic; and 60 foot candles at the end.

EXAMPLE 2

Cuts were made in an optic identical to example #1, but in which the depth of the cuts were increased to 0.125 inches. Photometric readings were taken and the following results were achieved: The beam pattern was approximately 26 degrees along the optic's longitudinal axis. A reading of 85 foot candles was found at 6 inches from the input end; 50 foot candies at the center of the optic; and 90 foot candles at the end.

EXAMPLE 3

A sample of SWN500 Lumenyte optical fiber manufactured by Lumenyte International Corporation was notched by hand and the optic was placed in a "c" shaped holding track reflector with the notches aligned along the back side of the holder thereby allowing light to pass through the optic and out of the open side of the holder. This assembly was mounted to the edge of a craps table such that light was cast onto the table surface. It was found that by rotating the optical fiber within the "c" shaped holder that the beam pattern of light cast onto the table surface was changed. Through experimentation it was discovered that light could be relatively and evenly distributred across the table surface by proper alignment and affixing the relative position of the optic to the holder.

COMPARATIVE EXAMPLE

A 1-foot section of a WN-500 optic manufactured by Lumenyte International corporation was notched to propagate light and was exposed to an open flame. The optic caught on fire and the flame spread rapidly. A same optic with the same notched configuration was placed in a track manufactured from Solvay PVDF and jacketed by E. I. DuPont FEP Teflon® and exposed to the same testing conditions. The latter assembly did not catch on fire as rapidly, and the track and jacketing imparted a fire retardancy to the optic.

APPLICATIONS

Applications for the product may include, but are not limited to edge lighting etched glass; refrigerator case lighting; interior of bus lighting; MRI room lighting; wall washing; cove lighting; step lighting; explosion proof areas; water falls; back panel display lighting; and automobile window break lighting.

While the present invention has been described in connection with what are presently considered to be the most practical, and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

We claim:

1. A linear conduit comprising:
   a monofilament, optical fiber;
   a cladding surrounding said optical fiber;
   said optical fiber including at least one illuminator;
   a holder positioned in contact with said cladding and adjacent to said illuminator;
   said holder including a light scattering portion positioned in spaced apart relation to said cladding to form an air gap between said cladding and said light scattering portion; and
   a jacket surrounding said optical fiber, cladding and holder.

2. The linear light conduit of claim 1 wherein said jacket is fire resistant.

3. The linear light conduit of claim 1 wherein said holder is fire resistant.

4. The linear light conduit of claim 1 wherein said holder is flame resistant.

5. The linear light conduit of claim 1 wherein said jacket is flame resistant.

6. A method for precisely aligning optical elements in an optical conduit comprising the steps of:
   positioning a fiber core and holder to direct light in a predetermined direction;
   maintaining the alignment and relative position of said fiber core and said holder in a jacketing; and
   forming said jacket about said fiber core and holder.

7. A method for cutting a notch in a fiber optic surrounded by fluoropolymer using a cutter:
   positioning said fiber optic proximate to said cutter;
   aligning said cutter at a first angle relative to said fiber optic surface;
   rolling said cutter about a circumference of said fiber optic causing a first cut;
   aligning said cutter at a second angle relative to said fiber optic surface;
   rolling said cutter about the circumference of said fiber optic causing a second cut;
   removing a notch of material formed by first and second cuts.

8. A fiber optic comprising:
   a fiber optic core;
   said fiber optic including a plurality of consistently notches;
   at least one of a plurality of optical elements from the group including lenses, color filters, intensity filters and holographic filters;
   said fiber optic core and optical element being precisely aligned with said notches to produce a desired light effect; and
   a jacket surrounding said fiber optic core and optical element to maintain optical alignment.

9. The fiber optic of claim 8 wherein said jacket includes optical elements formed therein.

10. The fiber optic of claim 8 wherein said jacket includes a flame retardant material.

11. The fiber optic of claim 8 wherein said jacket material includes a fire resistant material.

12. The fiber optic of claim 8 wherein said jacket includes mounting brackets formed thereon.

13. The fiber optic of claim 8 wherein said jacket is formed with multiple layers of jacket material.

14. A linear light conduit comprising:
    a monofilament, optical fiber;
    a cladding surrounding said optical fiber;
    said optical fiber including at least one cut;
    a holder positioned in contact with said cladding and adjacent to said illuminator, said holder including a light scattering portion positioned in spaced apart relation to said cladding to form an air gap between said cladding and said light scattering portion; and
    means for securing said holder against said cladding to main said holder adjacent to illuminator.

15. A linear light conduit comprising:
    a monofilament, optical fiber;
    a cladding surrounding said optical fiber;
    said optical fiber including a plurality of illuminators, each of said illuminators having a generally uniform size and shape;
    a holder and/or reflector positioned in contact with said cladding and adjacent to said illuminator, said holder including a light scattering portion positioned in spaced apart relation to said cladding to form an air gap between said cladding and said light scattering portion; and
    means for securing said holder against said cladding to main said holder adjacent to illuminator.

16. A linear light conduit attached to at least one light source, said conduit comprising:
    a monofilament, optical fiber;
    a cladding surrounding said optical fiber;
    said optical fiber including a plurality of illuminators along a first side and a light transmitting second side, each of said illuminators having a generally uniform size and shape to intersect light generated from said light source;
    each of said illuminators being positioned in spaced apart relation along said first side of said optical fiber at a predetermined angle from horizontal defining a light path from said light source to each of said illuminators and to said second side; and
    said second side having a predetermined optical characteristic to define the field of illumination.

17. The linear light conduit as set forth in claim 16 further comprising:
    a holder positioned in contact with said cladding and adjacent to said illuminators, said holder including a light scattering portion positioned in spaced apart relation to said cladding to formed from an air gap between said cladding and said light scattering portion; and
    means for securing said holder against said cladding to main said holder adjacent to illuminator.

18. A linear optical conduit comprising:
    a clad core having a predetermined length along a longitudinal axis, a radius extending from the axis to the circumferential periperhy of the clad core, a first light input end and a second end;
    a reflector extending longitudinally along the length of the clad core and extending radially through a arc which is less than 360 degrees about the circumferential periphphery of the clad core;

a plurality of cuts in said clad core at predetermined locations along its length, at predetermined depths into said clad core from its circumferential periphery and at predetermined angles between 0 degrees and 90 degrees, said predetermined angles being measured between the edge of each cut toward the first end of the clad core and longitudinal axis of the clad core, each cut forming a illuminator.

19. The conduit of claim 18 in which the cuts are symmetrical about a plane which extends from the reflector through the longitudinal axis and in a predetermined direction orthogonal to the longitudinal axis of the clad core.

20. A linear optical conduit comprising:

a clad core having a predetermined length along a longitudinal axis, a radius extending from the axis to the circumferential periperhy of the clad core, a first light input end and a second end;

a reflector extending longitudinally along the length of the clad core and extending radially through a arc which is less than 360 degrees about the circumferential periphery of the clad core;

a predetermined portion of clad core material removed from said clad core by a plurality of pairs of cuts in said clad core at predetermined locations along its length, at predetermined depths into said clad core from its circumferential periphery and at predetermined angles between 0 degrees and 90 degrees, said predetermined angles being measured from the cut of each pair nearer the first end and between the edge of said nearer cut toward the first end of the clad core and the longitudinal axis of the clad core, each pair of cuts forming a illuminator.

21. The conduit of claim 20 in which the pairs of cuts are symmetrical about a plane which extends from the reflector through the longitudinal axis and in a predetermined direction orthogonal to the longitudinal axis of the clad core.

* * * * *